United States Patent
Nagao et al.

(10) Patent No.: US 7,931,392 B2
(45) Date of Patent: Apr. 26, 2011

(54) MOTORCYCLE HAVING HEADLIGHT DISPOSED WITHIN CAVITY IN FORK ASSEMBLY

(75) Inventors: Daisuke Nagao, Long Beach, CA (US); Kenji Tamura, Redondo Beach, CA (US)

(73) Assignee: Honda Motor Company, Ltd., Tokyo (JP)

(*) Notice: Subject to any disclaimer, the term of this patent is extended or adjusted under 35 U.S.C. 154(b) by 256 days.

(21) Appl. No.: 12/254,883

(22) Filed: Oct. 21, 2008

(65) Prior Publication Data

US 2010/0096829 A1   Apr. 22, 2010

(51) Int. Cl.
*B62J 6/00* (2006.01)
(52) U.S. Cl. .................. 362/476; 362/473; 362/475
(58) Field of Classification Search ............. 362/473, 362/475, 476
See application file for complete search history.

(56) References Cited

U.S. PATENT DOCUMENTS

| 2,542,926 | A | | 2/1951 | Jozif et al. |
| 4,319,307 | A | | 3/1982 | Turner |
| 4,337,503 | A | | 6/1982 | Turner |
| 4,901,209 | A | | 2/1990 | Nitz |
| 5,008,782 | A | | 4/1991 | Murray |
| D374,729 | S | * | 10/1996 | Hauser .................... D26/28 |
| 6,036,339 | A | * | 3/2000 | Idoeta .................... 362/476 |
| 6,152,585 | A | | 11/2000 | Barry |
| 6,830,363 | B2 | | 12/2004 | Pisula |
| 7,001,051 | B2 | | 2/2006 | Palmer et al. |
| 7,188,980 | B2 | * | 3/2007 | Ase et al. ................. 362/476 |

* cited by examiner

*Primary Examiner* — Stephen F Husar
*Assistant Examiner* — Meghan K Dunwiddie
(74) *Attorney, Agent, or Firm* — Ulmer & Berne LLP

(57) ABSTRACT

A motorcycle includes a fork assembly and a headlight. The fork assembly is provided with a cavity. The headlight is at least partially disposed within the cavity in the fork assembly and is configured to selectively provide illumination ahead of the motorcycle.

20 Claims, 3 Drawing Sheets

US 7,931,392 B2

MOTORCYCLE HAVING HEADLIGHT DISPOSED WITHIN CAVITY IN FORK ASSEMBLY

TECHNICAL FIELD

A motorcycle includes a headlight disposed at least partially within a cavity provided within a fork assembly of the motorcycle.

BACKGROUND

Many conventional motorcycles include headlights which illuminate terrain ahead of the motorcycle. The headlights help to facilitate operation of the motorcycle during times of limited or no sunlight, and can also improve visibility of the motorcycle in adverse conditions, such as rain or snow. Conventional motorcycle headlights are often bolted or otherwise attached to the front fork and/or head tube of the motorcycle and/or are incorporated into a front fairing of the motorcycle. While these conventional headlights are effective to illuminate terrain ahead of the motorcycle, they can involve significant bulk and weight, and/or can adversely affect aerodynamics and aesthetics of the motorcycle. In addition, conventional headlights often have a relatively large external surface area which, in addition to the disadvantages already indicated, can be difficult to clean and is subject to damage (e.g., from impact, moisture, and/or debris) during use of the motorcycle.

SUMMARY

In accordance with one embodiment, a motorcycle comprises a fork assembly and a headlight. The fork assembly supports a front wheel and is provided with a cavity. The headlight is substantially entirely disposed within the cavity in the fork assembly and is configured to selectively provide illumination ahead of the motorcycle.

In accordance with another embodiment, a motorcycle comprises a fork assembly, a left headlight, and a right headlight. The fork assembly supports a front wheel and comprises a left fork member and a right fork member. The left fork member is provided with a left cavity and the right fork member is provided with a right cavity. The left headlight is at least partially disposed within the left cavity and the right headlight is at least partially disposed within the right cavity.

In accordance with yet another embodiment, a motorcycle comprises a fork assembly, a left headlight, and a right headlight. The fork assembly supports a front wheel and comprises a left fork member and a right fork member. The left fork member is provided with a left cavity and the right fork member is provided with a right cavity. The left headlight is substantially entirely disposed within the left cavity and the right headlight is substantially entirely disposed within the right cavity.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
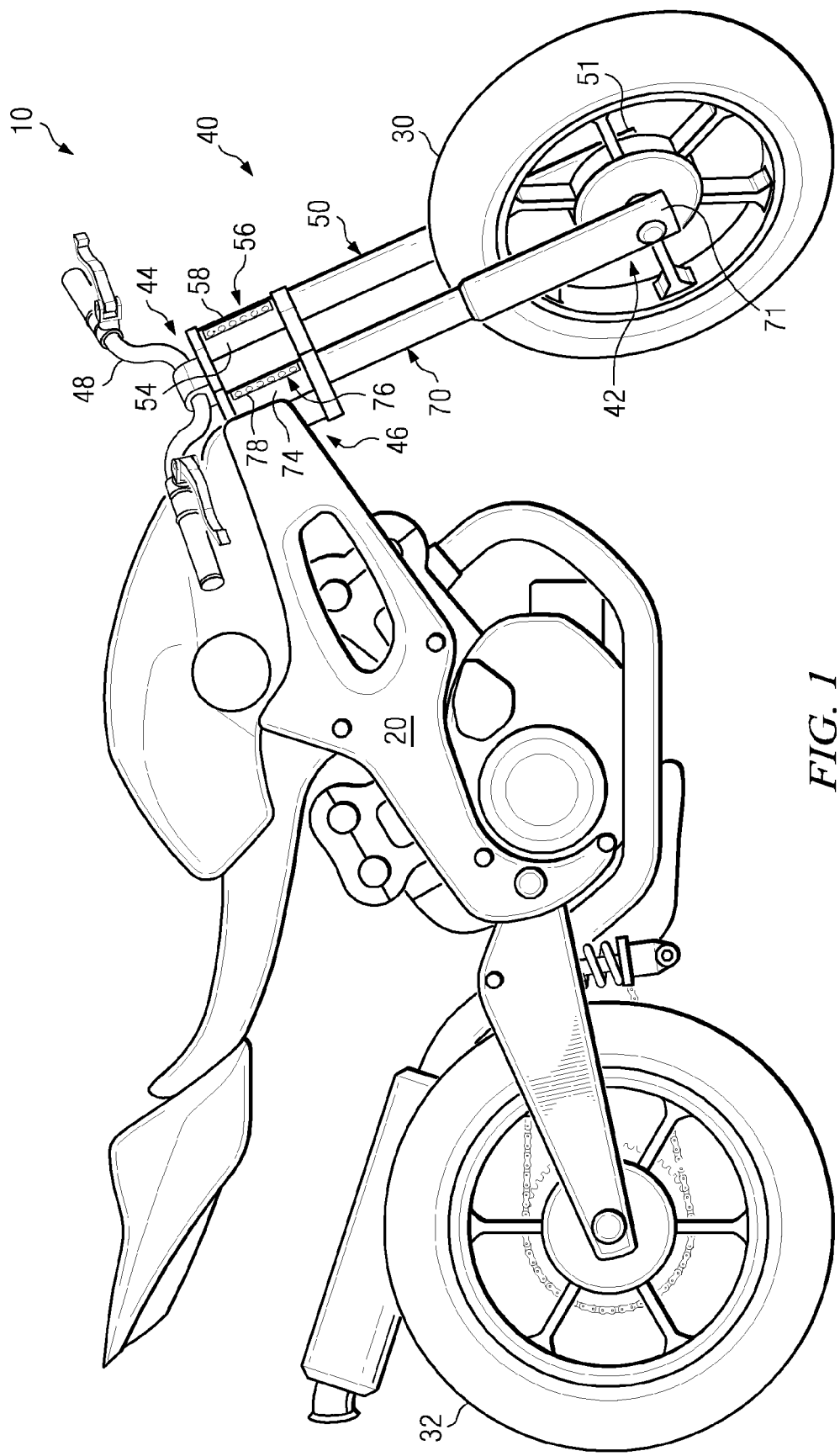
FIG. 1 is a side elevational view depicting a motorcycle having a headlight in accordance with one embodiment.

Embodiments are hereinafter described in detail in connection with the views and examples of FIGS. 1-3, wherein like numbers indicate the same or corresponding elements throughout the views. A motorcycle in accordance with one embodiment includes a headlight disposed at least partially within a cavity provided within a fork assembly of the motorcycle. For example, a motorcycle 10 is shown in FIG. 1 to include a front wheel 30 and a rear wheel 32. The motorcycle 10 is also shown to comprise a fork assembly 40 having a wheel interface portion 42, a handlebar interface portion 44, and a frame interface portion 46. The front wheel 30 is shown to be rotatably attached to the wheel interface portion 42 of the fork assembly 40. For example, the wheel interface portion 42 might include one or more mounts (e.g., 51 and 71) which is/are configured for attachment to an axle of the front wheel 30.

A handlebar assembly 48 is shown to be attached to the handlebar interface portion 44 of the fork assembly 40. The frame interface portion 46 of the fork assembly 40 is shown to be pivotally attached to a frame 20 of the motorcycle. An operator of the motorcycle 10 can use the handlebar assembly 48 to facilitate pivoting of the fork assembly 40 with respect to the frame 20 for steering of the motorcycle 10. As shown in the embodiment of FIG. 1, the frame interface portion 46 of the fork assembly 40 can be vertically disposed between the handlebar interface portion 44 of the fork assembly 40 and the wheel interface portion 42 of the fork assembly 40.

A fork assembly can be provided in any of a variety of configurations in accordance with various embodiments. For example, as shown in FIGS. 1-2, the fork assembly 40 is shown to comprise a left fork member 50 and a right-fork member 70. In one embodiment, as shown in FIGS. 1-2, the left fork member 50 can be spaced from the right fork member 70 (e.g., at the frame interface portion 46 of the fork assembly 40) in a corresponding and mirroring relationship with respect to, and on opposite sides of, an imaginary plane which vertically bisects the motorcycle 10 along a longitudinal axis of the motorcycle 10. As additionally shown in FIGS. 1-2, upper ends of the left and right fork members 50 and 70 can extend to the handlebar interface portion 44 of the fork assembly 40. Lower ends of the left and right fork members 50 and 70 can extend to the wheel interface portion 42 of the fork assembly 40 and can respectively include left and right mounts 51 and 71. The front wheel 30 can be rotatably attached to each of the left and right mounts 51 and 71.

The fork assembly 40 can be formed from any of a variety of materials including, for example, metal, plastic, fiberglass, carbon-fiber, composites, and/or any of a variety of other materials or combinations thereof. In one particular embodiment, as shown in FIGS. 1-2, each of the left and right fork members 50 and 70 can include respective outer surfaces 54 and 74 which can, for example, be formed from metal, plastic, fiberglass, carbon-fiber, composites, and/or any of a variety of other materials or combinations thereof. In one particular embodiment, the outer fork surfaces 54 and 74 can be formed from a non-metal material such as plastic, fiberglass or carbon-fiber. In another embodiment, the outer fork surfaces 54 and 74 can be formed from metal such as stainless steel or aluminum.

A headlight can be disposed at least partially within a cavity provided within a fork assembly of a motorcycle. The cavity can be provided as an opening or recess within a rail, member, tine, leg or other portion of a fork assembly, and in any of a variety of locations and configurations. For example, the left fork member 50 can be provided with a cavity (e.g., 52 shown in FIG. 3) and the right fork member 70 can similarly be provided with a cavity. Each of the cavities can be provided adjacent to the frame interface portion 46 of the fork assembly 40. However, in other embodiments, one or more cavities configured to receive headlight(s) can be provided elsewhere within a fork assembly (e.g., adjacent to the wheel interface portion 42 and/or the handlebar interface portion 44).

In accordance with one embodiment, a headlight 56 can be at least partially disposed within the cavity (e.g., 52 shown in FIG. 3) in the left fork member 50, and a headlight 76 can be at least partially disposed within the cavity in the right fork member 70. However, in accordance with another embodiment, as also shown in FIGS. 2-3, the headlight 56 can be substantially entirely disposed within the cavity, and the headlight 76 can be substantially entirely disposed within the cavity. It will be appreciated that any of a variety of fasteners, adhesives, interlocking mechanical features and/or other arrangements can be provided to facilitate attachment to a fork assembly of a headlight disposed at least partially or substantially entirely within a cavity of the fork assembly.

Figure 2:
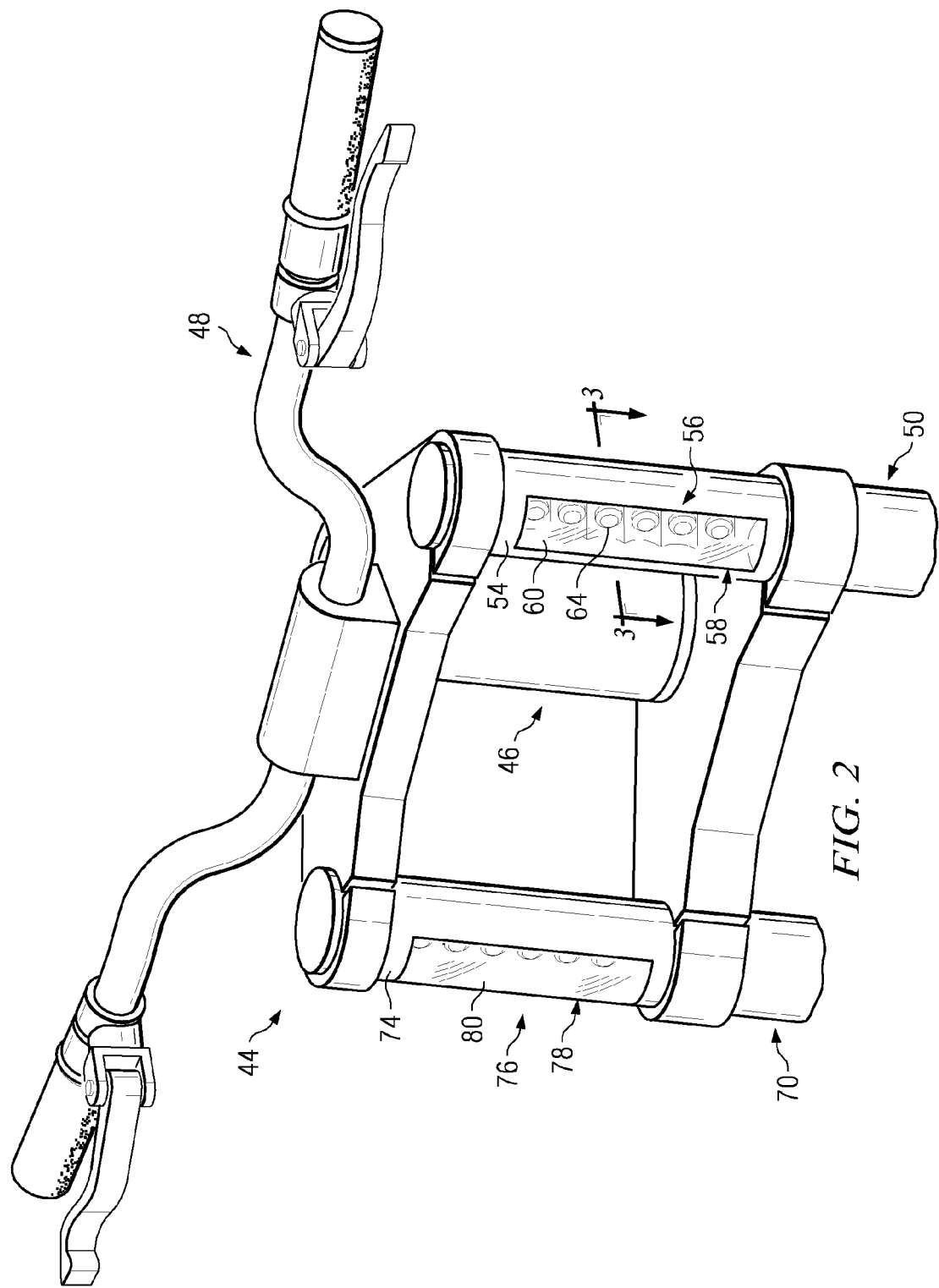
FIG. 2 is a front perspective view depicting a portion of the motorcycle of FIG. 1.
Figure 3:
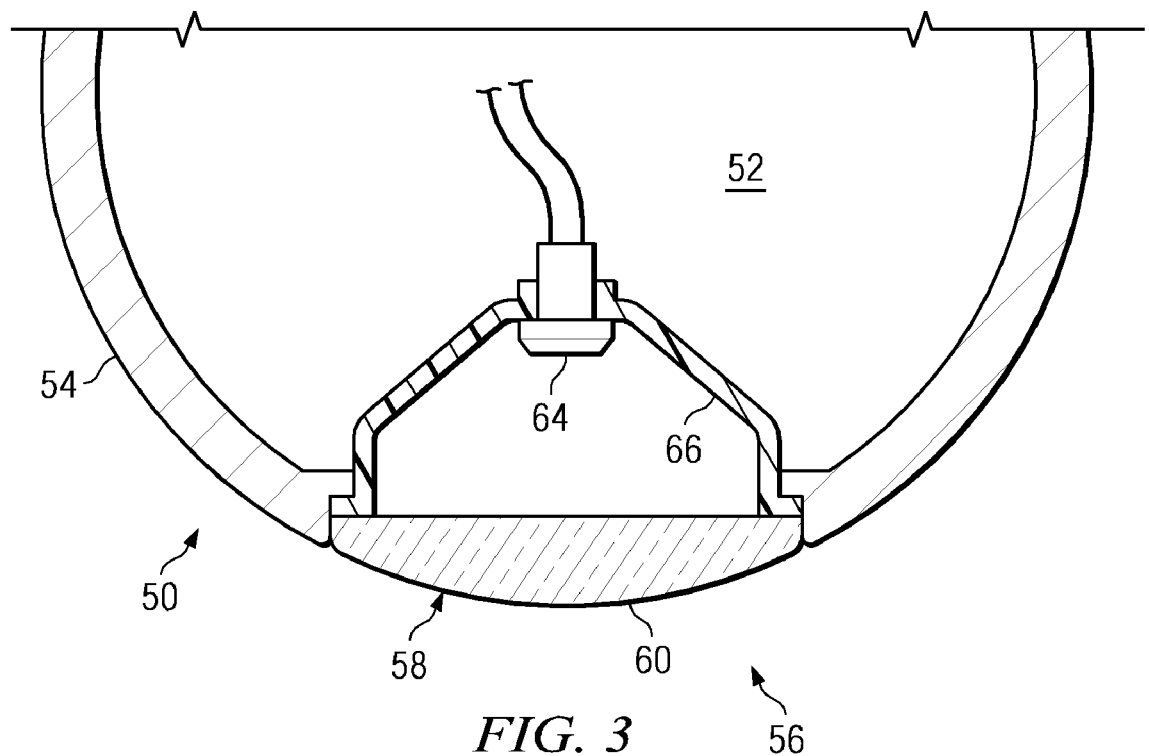
FIG. 3 is a sectional view taken along section lines 3-3 in FIG. 2.

As shown most clearly in FIGS. 2-3, the headlight 56 can include a lens 58 and a left reflective surface 66. The headlight 56 can also include an illumination source such as, for example, one or more light emitting diodes (LEDs), incandescent bulbs, halogen bulbs, fluorescent lamps, neon lamps, and/or high intensity discharge lamps. For example, as shown in FIGS. 2-3, the illumination source may comprise multiple LEDs 64. In one embodiment, the LEDs 64 can be configured to emit white light. The reflective surface 66 can be configured to reflect light from the illumination source and through the lens 58.

The lens 58 is shown in FIG. 3 to have an outer lens surface 60 which extends substantially continuously with adjacent portions of the outer fork surface 54. In other embodiments, the outer lens surface of a headlight might not extend substantially continuously with adjacent portions of an outer fork surface. In still other embodiments, a headlight might include a lens and/or other components which entirely extend above or below adjacent portions of an outer fork surface.

Referring again to FIGS. 1-2, the headlight 76 can include a lens 78, an illumination source and a reflective surface, much as described above with respect to the headlight 56. The reflective surface of the headlight 76 can be configured to reflect light from the illumination source of the headlight 76 and through the lens 78 of the headlight 76, much as described above with respect to the headlight 56. The lens 78 is shown to have an outer lens surface 80 which extends substantially continuously with adjacent portions of the outer fork surface 74, much as described above with respect to the headlight 56 and the outer fork surface 54. Other features of the headlight 76 are also much as described above with respect to the headlight 56.

The headlight 56 can be configured as a left headlight for the motorcycle 10, and the headlight 76 can be configured as a right headlight for a motorcycle 10, as shown in FIGS. 1-2. Each of the headlights 56 and 76 can be configured to emit respective beams of white light to provide illumination ahead of the motorcycle 10. In one embodiment, each of the headlights 56 and 76 can be configured to emit respective intense beams of white light, meaning that each of the headlights 56 and 76 has an output of at least about 1000 lumens. In one embodiment, each of headlights 56 and 76 can include illumination sources comprising multiple LEDs (e.g., six LEDs 64 in FIG. 2), and each of the headlights 56 and 76 has an output of at least about 1000 lumens (e.g., meaning that each LED 64 in FIG. 2 can produce at least about 200 lumens of light).

A motorcycle in accordance with alternative embodiments may include only a single headlight, or may alternatively include more than two headlights, and some or all of the headlights present on such a motorcycle may be disposed within cavities provided in a fork assembly. It will also be appreciated that one or more of the headlights disposed within cavities provided in a fork assembly of a motorcycle can be configured as low-beam headlamps, high-beam headlamps, driving headlamps, and fog headlamps. In one embodiment involving the headlight 56 of FIG. 2, it will be appreciated that one or more of the LEDs 64 might be configured to provide low-beam headlamp illumination, while others of the LEDs 64 might be configured to provide high-beam headlamp illumination. In another embodiment involving the headlight 56 of FIG. 2, it will be appreciated that one or more of the LEDs 64 might be configured to illuminate at different intensities depending upon whether the operator of the motorcycle 10 has elected low-beam or high-beam headlamp operation. By disposing the headlights 56 and 76 within cavities in the fork assembly 40, it will be appreciated that the headlights 56 and 76 do not add significant bulk and/or weight to the fork assembly 40, facilitate effective aerodynamics of the motorcycle 10, facilitate simple cleaning of the headlights 56 and 76 and the fork assembly 40, and also minimize likelihood of damage to the headlights 56 and 56 from external elements, such as rain and dust.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A motorcycle comprising:
    a fork assembly supporting a front wheel and comprising a left fork member and a right fork member, wherein the left fork member is provided with a left cavity and the right fork member is provided with a right cavity;
    a left headlight at least partially disposed within the left cavity and configured to emit a beam of light for illuminating terrain ahead of the motorcycle; and
    a right headlight at least partially disposed within the right cavity and configured to emit a beam of light for illuminating terrain ahead of the motorcycle.

2. The motorcycle of claim 1 wherein the left headlight comprises a left lens, a left illumination source, and a left reflective surface, the right headlight comprises a right lens, a right illumination source, and a right reflective surface, the left reflective surface is configured to reflect light from the left illumination source through the left lens, and the right reflective surface is configured to reflect light from the right illumination source through the right lens.

3. The motorcycle of claim 2 wherein each of the left illumination source and the right illumination source comprises multiple light emitting diodes.

4. The motorcycle of claim 1 wherein the left headlight is substantially entirely disposed within the left cavity, and wherein the right headlight is substantially entirely disposed within the right cavity.

5. The motorcycle of claim 2 wherein the left headlight is substantially entirely disposed within the left cavity, and wherein the right headlight is substantially entirely disposed within the right cavity.

6. The motorcycle of claim 3 wherein the left headlight is substantially entirely disposed within the left cavity, and wherein the right headlight is substantially entirely disposed within the right cavity.

7. The motorcycle of claim 1 wherein each of the left headlight and the right headlight is configured to emit a respective intense beam of white light.

8. The motorcycle of claim 2 wherein each of the left headlight and the right headlight is configured to emit a respective intense beam of white light.

9. The motorcycle of claim 3 wherein each of the left headlight and the right headlight is configured to emit a respective intense beam of white light.

10. A motorcycle comprising:
   a fork assembly supporting a front wheel and comprising a left fork member and a right fork member, wherein the left fork member is provided with a left cavity and the right fork member is provided with a right cavity;
   a left headlight at least partially disposed within the left cavity; and
   a right headlight at least partially disposed within the right cavity;
   wherein the left fork member comprises a left outer fork surface, the right fork member comprises a right outer fork surface, the left headlight comprises a left lens having a left outer lens surface, the right headlight comprises a right lens having a right outer lens surface, the left outer lens surface extends substantially continuously with adjacent portions of the left outer fork surface, and the right outer lens surface extends substantially continuously with adjacent portions of the right outer fork surface.

11. The motorcycle of claim 10 wherein the left headlight further comprises a left illumination source and a left reflective surface, the right headlight further comprises a right illumination source and a right reflective surface, the left reflective surface is configured to reflect light from the left illumination source through the left lens, and the right reflective surface is configured to reflect light from the right illumination source through the right lens.

12. The motorcycle of claim 11 wherein each of the left illumination source and the right illumination source comprises multiple light emitting diodes.

13. The motorcycle of claim 10 wherein each of the left headlight and the right headlight is configured to emit a respective intense beam of white light.

14. The motorcycle of claim 11 wherein each of the left headlight and the right headlight is configured to emit a respective intense beam of white light.

15. The motorcycle of claim 12 wherein each of the left headlight and the right headlight is configured to emit a respective intense beam of white light.

16. A motorcycle comprising:
   a fork assembly supporting a front wheel and comprising a left fork member and a right fork member, wherein the left fork member is provided with a left cavity and the right fork member is provided with a right cavity;
   a left headlight substantially entirely disposed within the left cavity; and
   a right headlight substantially entirely disposed within the right cavity;
   wherein the left fork member comprises a left outer fork surface, the right fork member comprises a right outer fork surface, the left headlight comprises a left lens having a left outer lens surface, the right headlight comprises a right lens having a right outer lens surface, the left outer lens surface extends substantially continuously with adjacent portions of the left outer fork surface, and the right outer lens surface extends substantially continuously with adjacent portions of the right outer fork surface.

17. The motorcycle of claim 16 wherein the left headlight further comprises a left illumination source and a left reflective surface, the right headlight further comprises a right illumination source and a right reflective surface, the left reflective surface is configured to reflect light from the left illumination source through the left lens, and the right reflective surface is configured to reflect light from the right illumination source through the right lens.

18. The motorcycle of claim 17 wherein each of the left illumination source and the right illumination source comprises multiple light emitting diodes.

19. The motorcycle of claim 18 wherein each of the left headlight and the right headlight is configured to provide illumination ahead of the motorcycle.

20. The motorcycle of claim 19 wherein each of the left headlight and the right headlight is configured to emit a respective intense beam of white light.

* * * * *